INVENTOR.
Buchanan Loesch
BY
Morse & Altman
ATTORNEYS

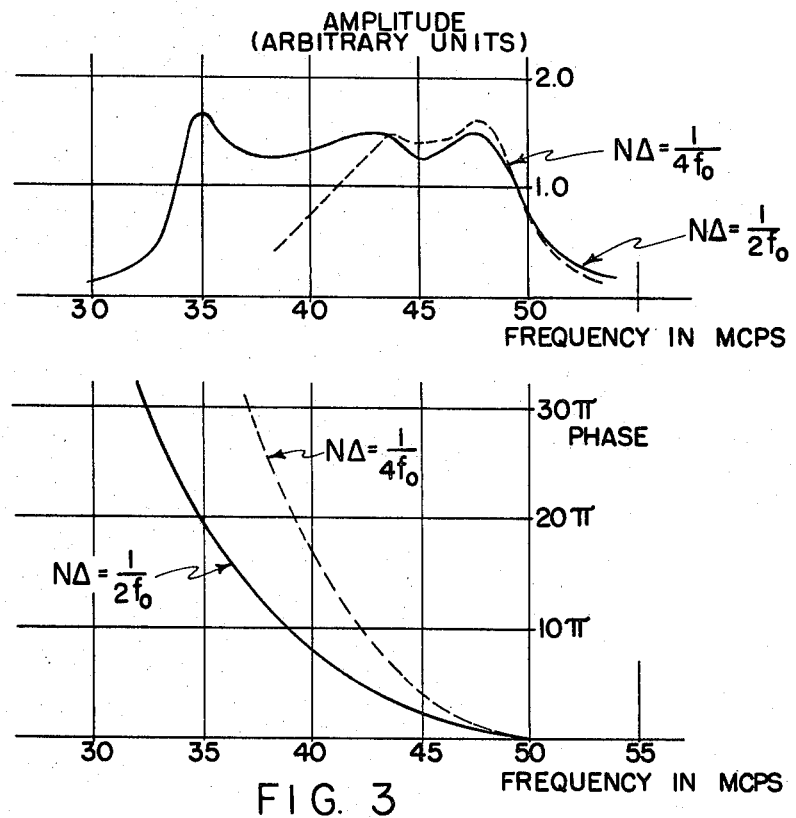
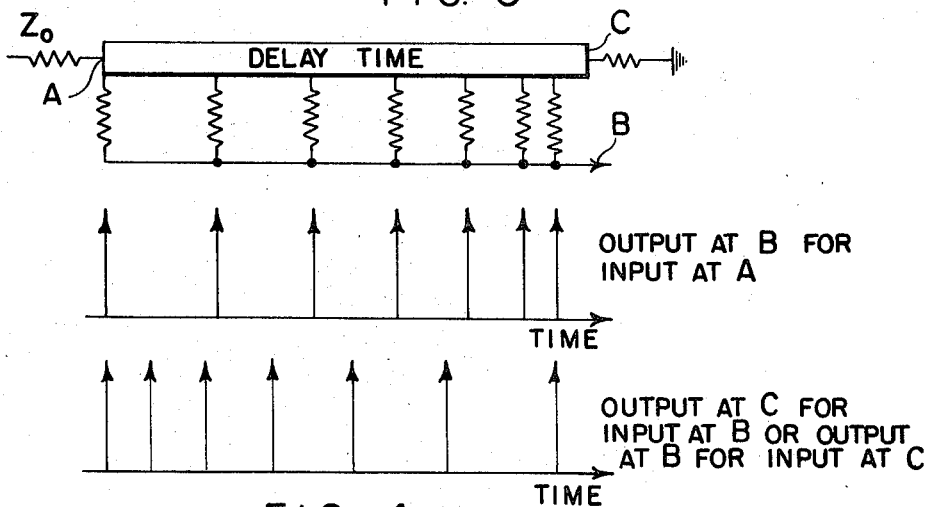
FIG. 3
FIG. 4
INVENTOR.
Buchanan Loesch
BY
Morse & Altman
ATTORNEYS

United States Patent Office 3,430,241
Patented Feb. 25, 1969

3,430,241
FREQUENCY MODULATED WAVE PULSE
TRANSMISSION AND RECEPTION
Buchanan Loesch, Reading, Mass., assignor, by mesne assignments, to the United States of America as represented by the Secretary of the Army
Filed Aug. 11, 1959, Ser. No. 833,107
U.S. Cl. 343—17.2                                  4 Claims
Int. Cl. G01s 7/30

The present invention relates to the transmission, propagation, and reception of energy and, more particularly, to the generation and use of indiscrete pulses of frequency modulated radiation, sometimes called chirp radiation. Such radiation, for example, is useful in radar systems where sharp range resolution is desired. Prior chirp systems have been characterized by transmitting and receiving components that have been relatively difficult to match and tune and complex to design and fabricate.

The object of the present invention is to provide components and systems of unprecedented simplicity and reliability for generating and receiving chirp radiation. The present invention contemplates the generation or reception of chirp radiation by a pulse compression or expansion component in the form of a delay line having a plurality of taps non-uniformly sequentially spaced therealong at functionally varying distances from each other. This network may be considered as having three terminals, of which the first and second are provided at the opposite ends of the delay line. A plurality of impedances, which are connected at their inner ends to the taps, are connected in common at their outer ends to provide the third terminal. The construction, for example, is such that a suitable wave that is gated, when applied to the first terminal, results in a wave at the third terminal that is expanded in time and frequency modulated. Conversely, for example, a suitable wave that is elongated in time and frequency modulated, when applied to one of the second and third terminals, produces at the other of the second and third terminals a wave that is compressed in time. A network of the foregoing type may be used in reverse to provide matched filtering as well as compression.

Other objects of the present invention will in part be obvious and will in part appear hereinafter.

The invention accordingly comprises the components and systems possessing the construction, combination of elements and arrangement of parts, which are exemplified in the following detailed disclosure and the scope of the application of which will be indicated in the appended claims.

For a fuller understanding of the nature and objects of the present invention, reference should be had to the following detailed description taken in connection with the accompanying drawings wherein.

Figure 1:
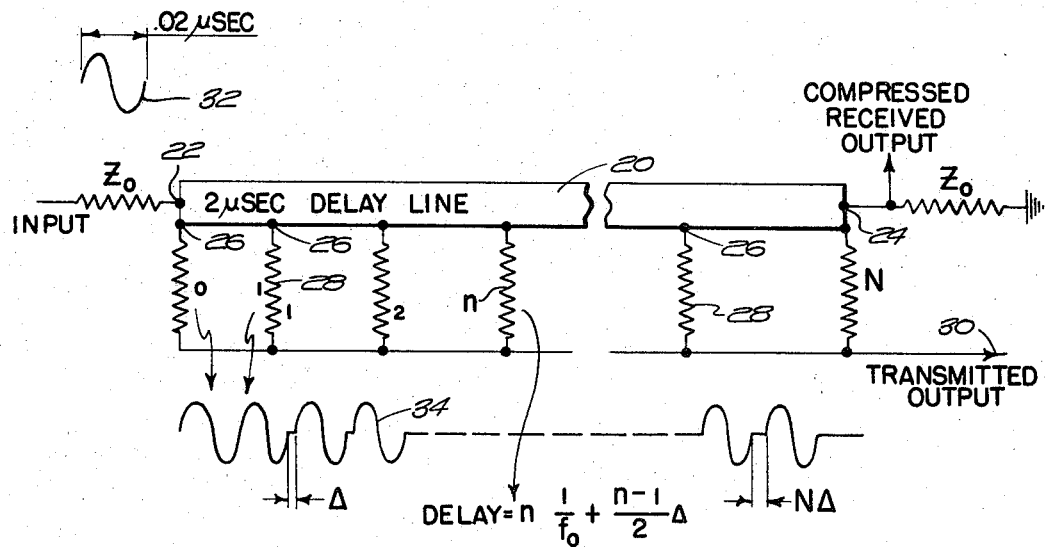
FIGURE 1 is a schematic diagram of a network embodying the present invention.

FIGURE 3 presents curves of Amplitude vs. Frequency and Phase vs. Frequency for the network of FIGURE 1; and FIGURE 4 illustrates the impulse response of a network embodying the present invention.

The network of FIGURE 1

Generally, the exemplary network of FIGURE 1 comprises a delay line 20 having a pair of terminals 22 and 24 at its opposed extremities and a plurality of intermediate taps 26. The spacing between adjacent taps 26 gradually increases along the delay line in the direction from terminal 22 to terminal 24. A plurality of resistors 28, which are connected at their inner ends to taps 26, are connected at their outer ends to a third terminal 30. The construction is such that an input pulse 32 applied to first terminal 22 results in a time-expanded and frequency modulated output 34 at third terminal 30. Also, a redirected frequency modulated input, analogous to wave 34, applied to second terminal 24 results in a time-compressed wave at third terminal 30. Alternatively, a redirected frequency modulated input, analogous to wave 34, applied to third terminal 30, results in a time-compressed wave at second terminal 24. Delay line 20, for example, is a long real coaxial line, a coiled strip line, a quartz acoustic line, a lumped constant line or any other suitable delay means.

A meaningful physical picture of the operation of the network of FIGURE 1 may be obtained by considering the following design calculations in which the following symbols and quantities will be used:

$\delta$ = Modulator pulse width = 0.02 microsecond.
$f_o$ = Fixed center frequency = 50 mcps.
$T$ = Transmitted pulse width = 2 microseconds.
$n$ = Tap $n$ of a multitap delay line.
$N$ = Total number of taps on line.
$\Delta$ = A very small time delay.

It is assumed that a multitap delay line is arranged so that the output from all taps are summed with equal weighting from each tap as indicated in FIGURE 1. A narrow sinusoidal pulse applied to one end of delay line 20 constitutes the input signal and the summed pulse from the line taps constitutes the output signal. The taps are spaced $1/f_o$ apart at the input end of the line and with linearly increased spacing to $$\frac{1.5}{f_o} \times$$

at the output end of the line. To accomplish this result, the delay at tap $n$ is as follows:

$$\text{Delay} = n\left[\frac{1}{f_o} + \frac{(n-1)\Delta}{2}\right]$$

The difference in delay between two successive taps is then:

Delay difference =

$$(n+1)\left(\frac{1}{f_o} + \frac{n\Delta}{2}\right) - m\left(\frac{1}{f_o} + \frac{(n-1)\Delta}{2}\right) = \frac{1}{f_o} + n\Delta$$

which is the desired linear increase of delay difference.

As shown in FIGURE 1, with the tap spacing chosen, there is a "gap" of one-half cycle in the output carrier wave between the last two tap outputs.

Then:

$$N\Delta = \frac{1}{2f_o}$$

and we can solve for $N$ and by noting that the total line time delay should equal the output pulse width, thus:

$$T = N\left[\frac{1}{f_o} + \frac{(N-1)\Delta}{2}\right] = \frac{100}{f_o}$$

$$N = 80$$

$$\Delta = \frac{1}{160 f_o}$$

For the conditions illustrated in FIGURE 1, the fundamental component of the output wave changes in period from $1/f_o$ at the start of the output pulse to $1.5/f_o$ at the end of the output pulse. The "instantaneous frequency" has been shifted from $f_o$ down to $0.67/f_o$ during one output pulse. On the basis of the preceding discussion, the frequency of the output pulse would be linearly shifted downward from 50 mcps. to 33 mcps., giving a frequency change of 17 mcps.

A number of very important advantages over other techniques are inherent in networks of the type described above. These are:

(1) The particular form of tapped line used for pulse expansion also is the correct matched filter for pulse compression. In reference to FIGURE 1, for example, the compressed pulse appears on terminal 30 of the delay line when the expanded signal is applied to terminal 24. Thus, this network is inherently its own matched filter and sideband inversion is not required as in lattice network systems.

(2) A non-uniformly tapped line is ideally adapted to the generation of non-linear frequency modulated pulses since nearly any form of non-linearity is realizable simply by shifting tap positions. The matched filter for reception is automatically provided. The use of non-linear frequency modulation tends to provide less "residue" signal.

(3) The weighting from the taps may be independently adjusted to produce any desired amplitude taper of the compressed pulse to seduce "residues."

(4) The desired network is extremely easy to implement and is highly amenable to experimental modifications for the reduction of residues:

(a) A real coaxial line is practical to use for short pulses. The low impedance of the coaxial line is of great practical advantage. (A strip line between two ground planes, all rolled into a coil, is an alternative practical design.) Line sections can be joined with very small spurious reflections and simple resistance (or impedance) summation may be used.

(b) No critical tuning elements are required—line lengths can be measured simply once the propagation constant has been determined.

(c) Long pulses may be generated by using some form of artificial or acoustical delay line.

Figure 2:
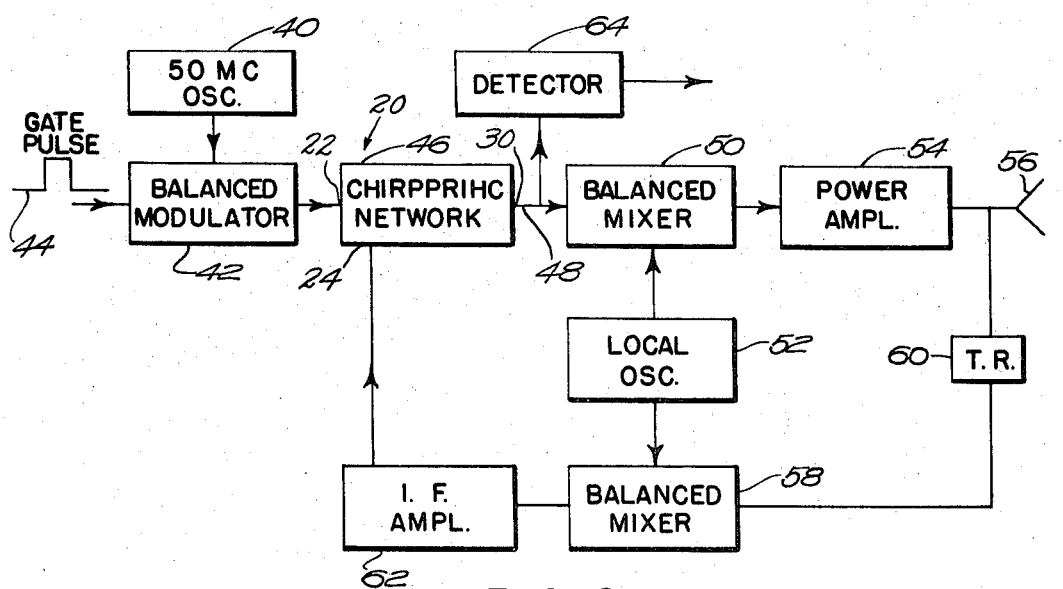
FIGURE 2 is an exemplary chirp radar system comprising transmitting and receiving networks of the type shown in FIGURE 1.

*The exemplary radar system of FIGURE 2*

In FIGURE 2 is shown a simplified block diagram of an X-band system that operates as follows. A 50 mcps. oscillator 40 supplies a continuous wave signal to a modulator circuit 42, which is gated by a 20 millimicrosecond pulse 44. The output (in this case one cycle of a 50 mcps. carrier) then is passed through a network 46, which expands the pulse width (in this case to 2 microseconds) as at 48. Like parts of network 48 are designated by the same numerals as like parts of the network of FIGURE 1. The expanded pulse then is mixed as at 50 with an X-band signal generated as at 52. The upper sideband of the output of mirer 50 is amplified by a high power traveling wave tube 54 and transmitted as at 56. For reception, the X-band signal from local oscillator 52 is mixed as at 58 with the received signal as intercepted by antenna 56 and applied through T.R. box 60 to mixer 58. The output of mixer 58, which is a replica of the expanded pulse generated by network 46, is amplified by IF amplifier 62 and applied for compression to network 46. The compressed pulse from the network 46 is envelope detected by a detector 64 and constitutes the desired information.

The network illustrated in FIGURE 1 accepts an input pulse at its left end and generates an output pulse of decreasing frequency. It will be apparent that the input pulse could just as well be connected to the right end of the line in order to generate a transmitted pulse of increasing frequency. This property is inherent in the matched filter networks of the present type, therefore, can generate output pulses that are swept either upwardly or downwardly in frequency.

It is possible to calculate the transfer function of such networks to demonstrate that this class of networks has the amplitude and phase characteristics required for pulse expansion and compression. In performing this calculation, reference is made to FIGURE 1, which shows a schematic representation of a tapped 2 microsecond delay line in which the tap spacing at the input end of the line is $1/f_o$ and with linearly increased tap spacing toward the far end of the line. From the representation of the output waveforms, it is apparent that the transmitted pulse sweeps downwardly in frequency for the input at the left end of the line, and the total instantaneous frequency excursion is from $\omega_0$ to $$\frac{\omega_o}{1+N\Delta f_o}$$

It may be shown that the exact expression for the network frequency response is the summation $$\frac{e_o}{e_i} = \sum_{n=0}^{N} e^{-j\omega n \left[\frac{1}{f_o} + \frac{n-1}{2}\Delta\right]}$$

where $e_i$ is the voltage of a sinusoidal input signal, $e_o$ is the voltage of the output signal and $$e^{-j\omega n \left[\frac{1}{f_o} + \frac{n-1}{2}\Delta\right]}$$

is the angular frequency of the input signal. Computation of frequency response utilizing this relationship becomes laborious even for a network with relatively few taps because at each of the input signal, the output from each tap must be computed and the results then added vectorially. Consequently, a somewhat more manageable integral approximation of the response, derived from the exact expression is used.

Referring to the exact expression, when $\Delta$ is much less than $1/f_o$, the following approximation is possible:

$$\frac{e_o}{e_i} = \sum_{n=0}^{N} e^{-j\left[\frac{\omega n}{f_o} + \frac{\omega n^2 \Delta}{2}\right]}$$

Define now a fractional parameter, $\sigma$, by the equation $\omega=\omega_0(1+\sigma)$ where $\omega_0$ is the fixed center frequency. Since $e^{2\pi j}=1$, we can write $$\frac{e_o}{e_i} = \sum_{n=0}^{N} e^{-j[2\pi n\sigma - \pi f_o(1+\sigma)n^2 \Delta]}$$

Define a new variable, $\chi$, such that $\chi^2 = c^2 n^2$ where $c^2 = 2f_o(1+\sigma)\Delta$.
Then $$\frac{e_o}{e_i} = \sum_{n=0}^{cN} e^{-j\left[\frac{2\pi\sigma\chi}{c} + \frac{\pi}{2}\chi^2\right]}$$

If the frequency variable is restricted to a region about $f_o$ so that successive terms in the summation do not change excessively in phase, the summation may then be closely approximated by an integral as follows:

$$\frac{e_o}{e_i} \approx \frac{1}{c}\int_0^{cN} e^{-j\left[\frac{2\pi\sigma\chi}{c} + \frac{\pi}{2}\chi\right]} dx$$

Consider next the exponent of $e$, and "complete the square" of this exponent in the variable, $\chi$. Thus, for the exponent only $$j\frac{\pi}{2}\left[\chi^2 + \frac{4\sigma\chi}{c} + \frac{4\sigma^2}{c^2}\right] - j\frac{2\pi\sigma^2}{c^2} = j\frac{\pi}{2}u^2 - j\frac{2\pi\sigma^2}{c^2}$$

where $$u = \left[\chi + \frac{2\sigma}{c}\right]$$

The response can now be written as $$\frac{e_o}{e_i} = \frac{1}{c} e^{+j\frac{2\pi\sigma^2}{c^2}} \int_{u_1}^{u_2} e^{-j\frac{\pi}{2}u^2} du$$

where $$u_1 = \frac{\sigma\sqrt{2}}{\sqrt{f_o\Delta(1+\sigma)}}$$

and $$u_2 = \frac{\sigma\sqrt{2}}{\sqrt{f_o\Delta(1+\sigma)}}\left[1+\frac{N\Delta f_o(1+\sigma)}{\sigma}\right]$$

The purpose of the preceding mathematical manipulations can now be clarified. The integral part of the expression is the Fresnel integral and its solution is Cornu's spiral and is tabulated in Jahnke and Emde, pages 34–37. It will be noted that by completing the square of the exponent within the integral, the expression has been separated into two multiplying factors—i.e.; an exponential term of constant amplitude which can be brought outside the integral and which produces the required parabolic phase, and the Fresnel integral which is the amplitude function and bounds the useful response. The amplitude response is also determined to a minor extent by the first square root term of the expression.

Now using the general integral expression, calculation of the frequency and phase response will be made for two cases, both of which will be designed to produce a 2 microsecond output pulse for a 0.02 microsecond input pulse. In the first case, it will be assumed that $N\Delta=1/2f_o$, which means that the "gap" in the waveform at the far end of the line is ½ cycle. The values of N and $\Delta$ are then $N=80$ and $\Delta=1/160f_o$. With these values substituted in the general expression, computation of the amplitude response can be made by the use of the tables in Jahnke and Emde. The result has been plotted as the solid curve in FIGURE 3. The phase angle, $\theta$, in this case is $$\theta = \frac{160\pi\sigma^2}{(1+\sigma)}$$

and has been plotted also in FIGURE 3. The calculated phase slope near 50 mcps. has a value of 0.064 microseconds/megacycle.

In the second case, also plotted in FIGURE 3, the "gap" in the output waveform is assumed to be only ¼ cycle, or $N\Delta=1/4f_o$; then $N=90$, $\Delta=1/360f_o$, and $$\theta = \frac{360\pi\sigma^2}{(1+\sigma)}$$

It will be noted that the network response has only approximately half the bandwidth of the first case which intuitively seems correct since the "frequency" has only deviated half as far. The phase slope is twice the previous case.

It should be emphasized that although the networks discussed above have all been designed pictorially for given input pulses, the calculated responses for the network will, of course, be unchanged no matter what input pulses are applied. This fact is emphasized because the network characteristics show that slightly different pulses from the ones assumed are perhaps better. For instance, in one of the preceding examples, the network characteristic had a bandpass centered at approximately 41.5 mcps. and thus a pulse with this center frequency instead of 50 mcps. would perhaps be better. With $f_o=41.5$ mcps. the picture of the output waveform would have a reduced "gap" at the end of the transmitted pulse, and would have a "negative gap" or sine wave overlap at the start of the pulse. The "gap" would thus be symmetrically distributed plus and minus about the center of the delay line.

*Delay line attenuation considerations—FIGURE 1*

In the preceding discussion, the delay line of the network has been assumed to be lossless, an assumption that is not realistic for large pulse expansion ratios. Brief consideration is given here to line attenuation.

Line attenuation will be considered on the basis of always maintaining the terminated end of the line as a matched filter to the transmitted signal. In this respect it is expedient to consider the impulse response of the network and to first consider the impulse response for a lossless delay line. In FIGURE 4 is shown the impulse response at output terminal B for an impulse input at the left end of a lossless line, terminal A. As represented, this response consists of a series of impulses spaced according to the tap delay formula. If now, an impulse input is applied at terminal B, the output at terminal C consists of a series of impulses with a mirror image spacing in time compared to the first series. This is the requirement for a matched filter and thus demonstrates quite simply that the filter from terminal B to C is matched to the transmitted signal. (The matched filter could just as well be defined as from C to B.)

Now when the attenuation of the delay line is considered the impulse response at B for an input at A will be a series of impulses spaced according to the tap spacing, but of decreasing amplitude with delay. One method of maintaining equal amplitude outputs would be to weight the tap summation resistors inversely to the line attenuation. If this is done, then the impulses response from B to C will not have equal amplitude outputs, and thus a matched filter will not be obtained. To obtain a matched filter for this case, it is necessary to use a second delay line tapped identically to the first but with summation resistors weighted in inverse fashion to the first delay line. This is one method to be considered for practical system use.

Many other possibilities exist for compensation of line attenuation. Thus: active amplifiers may be used; the weighting network may be switched by crystal diodes for transmission and reception; very low attenuation lines may be built by using a wide strip of metal ribbon between two ground planes and rolled into a coil; etc.

It should be mentioned that although in all of the foregoing discussion, the summation network has indicated resistors as the summation elements, these elements need not be restricted to resistors. Capacitors or inductors of relatively high impedance compared to line impedance also could be used. In fact, any complex impedance could be employed.

Since certain changes may be made in the above components and systems without departing from the scope of the invention herein involved, it is intended that all matter contained in the above description or shown in the accompanying drawing shall be interpreted in an illustrative and not in a limiting sense.

What is claimed is:

1. A modulation network comprising a first terminal, a second terminal, a delay line extending between said first terminal and said second terminal, a plurality of intermediate taps along said delay line, the spacing between said intermediate taps decreasing continuously, a plurality of resistors, a third terminal, said resistors being operatively connected between said taps and said third terminal, and means for applying a gated pulse to one of said terminals.

2. A radar system comprising transmitting means, receiving means and modulating means, said modulating means comprising a network having a first terminal, a second terminal, a delay line extending between said first terminal and said second terminal, a plurality of intermediate taps along said delay line, the spacing between said intermediate taps increasing from said first terminal to said second terminal, a plurality of resistors, a third terminal, said resistors being operatively connected between said taps and said third terminal, said transmitting means including primary oscillating means for producing a signal, gating means for applying an intermittent pulse of said signal to said first terminal, local oscillating means, mixing means, switching means and antenna means, said third terminal and said local oscillating means being operatively connected to said mixing means to radiate an expanded pulse from said antenna means, when said switching means is in one state, detecting means operatively connected to said second terminal, said antenna means and said local oscillating means being operatively connected to said mixing means to apply an echo pulse corresponding to said intermittent pulse to said modulating means, said modulating means being responsive to said echo pulse to apply to said detector a compressed pulse corresponding to said echo pulse.

3. In combination, means for transmitting a plurality of successive signals of selectable frequencies, means for receiving said transmitted signals, and means comprising a non-linear tapped delay line for generating said signals for transmission and for producing real time correlation of said signals upon reception.

4. In combination, means for transmitting a plurality of sequences of successive signals of selectable frequencies, means for receiving said transmitted signals, and means comprising a non-linear tapped delay line for generating said signals for transmission and for producing real time correlation of said signals upon reception, said latter means including summing circuit means.

References Cited

UNITED STATES PATENTS

| | | | |
|---|---|---|---|
| 2,678,997 | 5/1954 | Darlington | 343—14 |
| 2,759,044 | 8/1956 | Oliver | 333—70 |
| 2,897,442 | 7/1959 | Wright et al. | 333—70 |
| 2,922,965 | 1/1960 | Harrison | 333—70 |
| 2,982,852 | 5/1961 | Fano | 250—6.9 |
| 2,624,876 | 1/1953 | Dicke | 343—13 |

OTHER REFERENCES

Kallmann: Transversal Filters; Proceedings of the I.R.E., vol. 28, pp. 302–310, July 1940.

RODNEY D. BENNETT, *Primary Examiner.*

JEFFREY P. MORRIS, *Assistant Examiner.*

U.S. Cl. X.R.

343—14

UNITED STATES PATENT OFFICE
CERTIFICATE OF CORRECTION

Patent No. 3,430,241                          February 25, 1969

Buchanan Loesch

It is certified that error appears in the above identified patent and that said Letters Patent are hereby corrected as shown below:

Column 4, line 25, "$e^{-jwn[\frac{1}{fo} + \frac{n-1}{2} \Delta]}$" should read -- $\omega$ --.

Signed and sealed this 16th day of June 1970.

(SEAL)
Attest:

Edward M. Fletcher, Jr.
Attesting Officer

WILLIAM E. SCHUYLER, JR.
Commissioner of Patents